United States Patent
Cho et al.

(10) Patent No.: US 11,455,818 B2
(45) Date of Patent: Sep. 27, 2022

(54) ELECTRONIC DEVICE COMPRISING ADHESIVE MEMBER

(71) Applicant: Samsung Display Co., Ltd., Yongin-si (KR)

(72) Inventors: Yewon Cho, Hwaseong-si (KR); Dongeun Lee, Asan-si (KR); Dongjin Jeong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 239 days.

(21) Appl. No.: 16/563,145

(22) Filed: Sep. 6, 2019

(65) Prior Publication Data
US 2020/0160020 A1     May 21, 2020

(30) Foreign Application Priority Data
Nov. 16, 2018 (KR) .................. 10-2018-0141661

(51) Int. Cl.
| | | |
|---|---|---|
| *G06V 40/13* | (2022.01) | |
| *G06F 1/16* | (2006.01) | |
| *G06F 3/044* | (2006.01) | |

(52) U.S. Cl.
CPC ........ *G06V 40/1306* (2022.01); *G06F 1/1601* (2013.01); *G06F 3/044* (2013.01)

(58) Field of Classification Search
CPC ....... G06K 9/0002; G06K 9/0004; C09J 7/00; C09J 7/02; C09J 2301/124; C09J 2301/416; C09J 2203/318
See application file for complete search history.

(56) References Cited

U.S. PATENT DOCUMENTS

| | | | |
|---|---|---|---|
| 9,886,613 B2 | 2/2018 | Pi et al. | |
| 9,959,444 B2 | 5/2018 | Young et al. | |
| 10,002,278 B2 | 6/2018 | Song et al. | |
| 2007/0108032 A1* | 5/2007 | Matsumoto | G06F 3/0412 200/512 |
| 2011/0102569 A1 | 5/2011 | Erhart | |
| 2011/0308731 A1* | 12/2011 | Dalmis | C09J 123/0853 156/332 |
| 2012/0281383 A1* | 11/2012 | Hwang | G02F 1/133308 361/807 |
| 2014/0352440 A1* | 12/2014 | Fennell | G01N 29/22 73/632 |
| 2016/0063299 A1 | 3/2016 | Hung et al. | |
| 2017/0012339 A1* | 1/2017 | Ito | H01O 1/2208 |
| 2017/0300736 A1* | 10/2017 | Song | G06K 9/0004 |
| 2017/0344148 A1 | 11/2017 | Han et al. | |

(Continued)

FOREIGN PATENT DOCUMENTS

| | | |
|---|---|---|
| CN | 1967457 A | 5/2007 |
| CN | 102768420 A | 11/2012 |

(Continued)

*Primary Examiner* — Yuzhen Shen
(74) *Attorney, Agent, or Firm* — Lewis Roca Rothgerber Christie LLP

(57) ABSTRACT

An electronic device includes: a display module; a first adhesive member having a multi-layered structure and having a first adhesive surface attached on a back surface of the display module; and a sensing module including a sensing area, the sensing area being attached on a second adhesive surface facing the first adhesive surface of the first adhesive member.

19 Claims, 15 Drawing Sheets

(56) References Cited

U.S. PATENT DOCUMENTS

| | | | | |
|---|---|---|---|---|
| 2017/0364726 A1* | 12/2017 | Buchan | ............... | H01L 41/047 |
| 2018/0039815 A1 | 2/2018 | Jung et al. | | |
| 2019/0073505 A1* | 3/2019 | Kwon | ............... | H05K 1/0203 |
| 2019/0205593 A1* | 7/2019 | Kim | ............... | H01L 51/52 |
| 2020/0036119 A1* | 1/2020 | Tsubotani | ............ | H01R 12/62 |

FOREIGN PATENT DOCUMENTS

| | | | | |
|---|---|---|---|---|
| CN | 104751125 A | | 7/2015 | |
| CN | 105094227 A | | 11/2015 | |
| CN | 105264543 A | | 1/2016 | |
| CN | 105843462 A | | 8/2016 | |
| CN | 205809952 U | | 12/2016 | |
| CN | 206388849 U | | 8/2017 | |
| CN | 107423691 A | | 12/2017 | |
| CN | 107688407 A | | 2/2018 | |
| CN | 108549499 A | * | 9/2018 | ............ G06F 3/041 |
| JP | 2007-140724 A | | 6/2007 | |
| KR | 10-2012-0123767 A | | 11/2012 | |
| KR | 10-2017-0126337 A | | 11/2017 | |
| KR | 10-2017-0136061 A | | 12/2017 | |
| KR | 10-2018-0003904 A | | 1/2018 | |
| KR | 10-2018-0005588 A | | 1/2018 | |
| KR | 10-2018-0011547 A | | 2/2018 | |
| KR | 10-2018-0015371 A | | 2/2018 | |
| KR | 10-2018-0044764 A | | 5/2018 | |
| TW | 201608479 A | | 3/2016 | |

* cited by examiner

ELECTRONIC DEVICE COMPRISING ADHESIVE MEMBER

CROSS-REFERENCE TO RELATED APPLICATION

This application claims priority to and the benefit of Korean Patent Application No. 10-2018-0141661, filed on Nov. 16, 2018, the entire contents of which are incorporated herein by reference.

BACKGROUND

An electronic device provides various functions for communicating with a user, such as displaying images to provide information to a user and sensing input from a user.

Recently developed electronic devices include a function for sensing fingerprints of a user. Examples of fingerprint sensing methods include a capacitance method for sensing a change in capacitance formed between electrodes, an optical method for sensing incident light by using an optical sensor, and an ultrasound method for sensing vibration using a piezoelectric body, and/or the like.

In recently developed electronic devices, a sensing module for sensing fingerprints is on a back surface of a display panel and assembled.

SUMMARY

Embodiments of the present disclosure relate to an electronic device and, for example, provide an electronic device having a fingerprint sensing function.

An embodiment of the present disclosure provides an electronic device including: a display module; a first adhesive member having a multi-layered structure and having a first adhesive surface attached on a back surface of the display module; and a sensing module including a sensing area, the sensing area being attached on a second adhesive surface facing the first adhesive surface of the first adhesive member.

In an embodiment, the first adhesive member may include a base layer, a first adhesive layer on a first surface of the base layer, and a second adhesive layer on a second surface facing the first surface of the base layer.

In an embodiment, each of the first adhesive layer and the second adhesive layer may comprise any one selected from an adhesive resin, a pressure sensitive adhesive film, and an optical transparent adhesive film.

In an embodiment, each of the first adhesive layer and the second adhesive layer may have an adhesive force of 300 gf/in or greater.

In an embodiment, the base layer may comprise a polymer material.

In an embodiment, the base layer may comprise a polyester material or a polyimide material.

In an embodiment, the base layer may have a modulus (e.g., an elastic modulus or Young's modulus) in a range of 150 MPa to 10 GPa.

In an embodiment, the first adhesive member may have a thickness in a range of 5 μm to 200 μm.

In an embodiment, the electronic device may further include a second adhesive member including a photoinitiator, the second adhesive member being attached to a side surface of the sensing module, a side surface of the first adhesive member, and the back surface of the display module.

In an embodiment, the photoinitiator may be configured to be activated by ultraviolet light.

In an embodiment, the sensing module and the back surface of the display module may be spaced apart from each other at a set or predetermined interval, and a space formed between the sensing module and the back surface of the display module that are spaced apart from each other may be at least partially filled with the first adhesive member.

In an embodiment, the sensing module may include a fingerprint sensing sensor configured to utilize an ultrasonic wave.

In an embodiment, the display module may be divided into a display area configured to display an image, and a peripheral area adjacent to the display area on a plane, and the sensing module may overlap the display area on the plane.

In an embodiment, the electronic device may further include a circuit substrate electrically coupled to the display module and below the back surface of the display module, wherein the circuit substrate has an opening overlapping the sensing module.

In an embodiment, the display module may include: a display panel including a plurality of pixels configured to display an image, and a cover panel on a back surface of the display panel and having an opening.

In an embodiment, the first adhesive member may be attached to the back surface of the display panel exposed by the opening.

In an embodiment, the display panel may include a planar portion, and a protrusion portion that protrudes from the planar portion and is bent relative to the planar portion, and a portion of the cover panel may be between the planar portion and the protrusion portion.

In an embodiment, the display panel may include a base substrate, a display element layer on the base substrate, an encapsulation layer on the display element layer, and an input sensing unit on the encapsulation layer.

In an embodiment of the present disclosure, an electronic device includes a display module including a front surface having a display area and a peripheral area adjacent to the display area, and a back surface facing the front surface, a first adhesive member including a base layer, a first adhesive layer on a first surface of the base layer, and a second adhesive layer on a second surface facing the first surface of the base layer, a sensing module including a sensing area that overlaps the display area and is configured to sense a fingerprint in an ultrasonic manner (e.g., to ultrasonically sense an input from a fingerprint), wherein the second adhesive layer of the first adhesive member attached to the sensing area, and a second adhesive member including a photoinitiator, the second adhesive member being attached to a portion of the sensing module and the back surface of the display module.

In an embodiment, the sensing module and the back surface of the display module may be spaced apart from each other at a set or predetermined interval, and a space between the sensing module and the back surface of the display module that are spaced apart from each other may be at least partially filled with the first adhesive member.

BRIEF DESCRIPTION OF THE FIGURES

The accompanying drawings are included to provide a further understanding of the subject matter of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
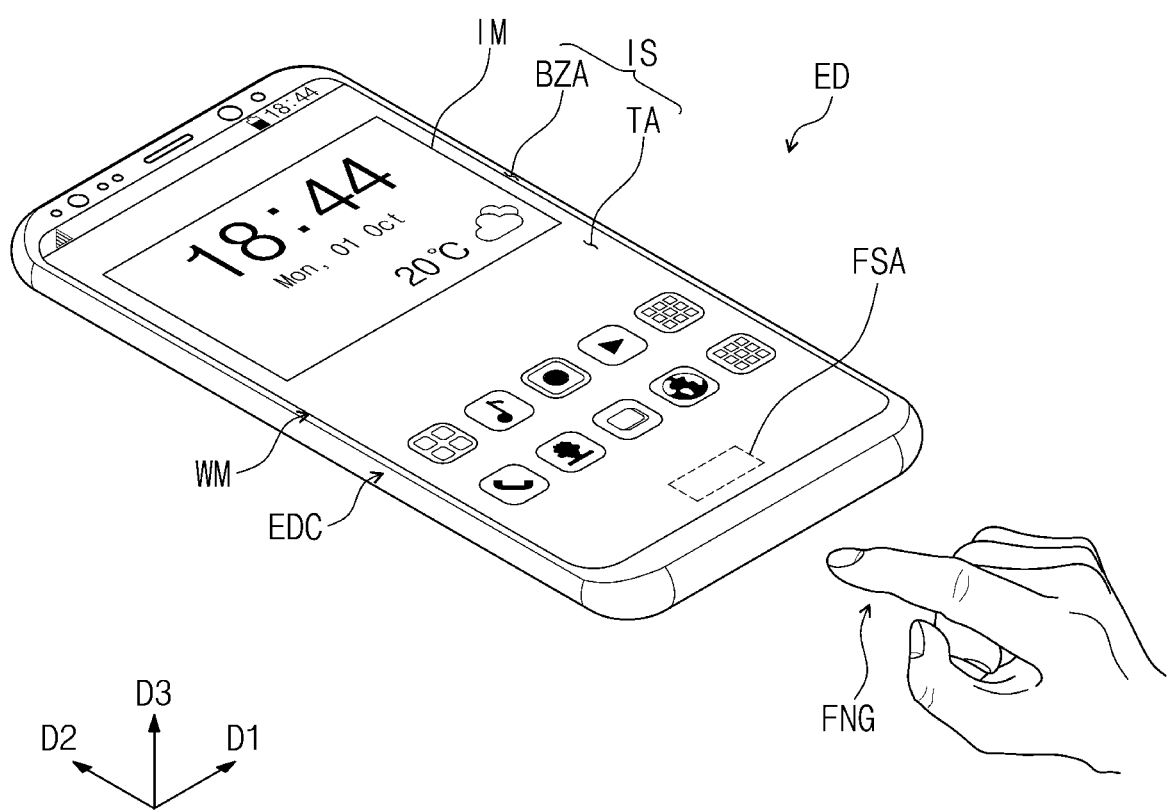
FIG. 1 is a perspective view of an electronic device according to an embodiment of the present disclosure.

In the present disclosure, when an element (or a region, a layer, a portion, etc.) is referred to as being "on," "connected to," or "coupled to" another element, it means that the element may be directly on/connected to/coupled to the other element, or that a third element may be therebetween. In addition, it will also be understood that when an element or layer is referred to as being "between" two elements or layers, it can be the only element or layer between the two elements or layers, or one or more intervening elements or layers may also be present.

Like reference numerals refer to like elements. Also, in the drawings, the thickness, the ratio, and the dimensions of elements may be exaggerated for clarity of description.

As used herein, the term "and/or," includes any and all combinations of the one or more listed items.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the spirit and scope of the present disclosure. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise," and "have" are intended to specify the presence of stated features, integers, acts, operations, elements, components, or combinations thereof in the disclosure, but do not preclude the presence or addition of one or more other features, integers, acts, operations, elements, components, or combinations thereof.

Hereinafter, exemplary embodiments of the present disclosure will be described with reference to the accompanying drawings.

Figure 2:
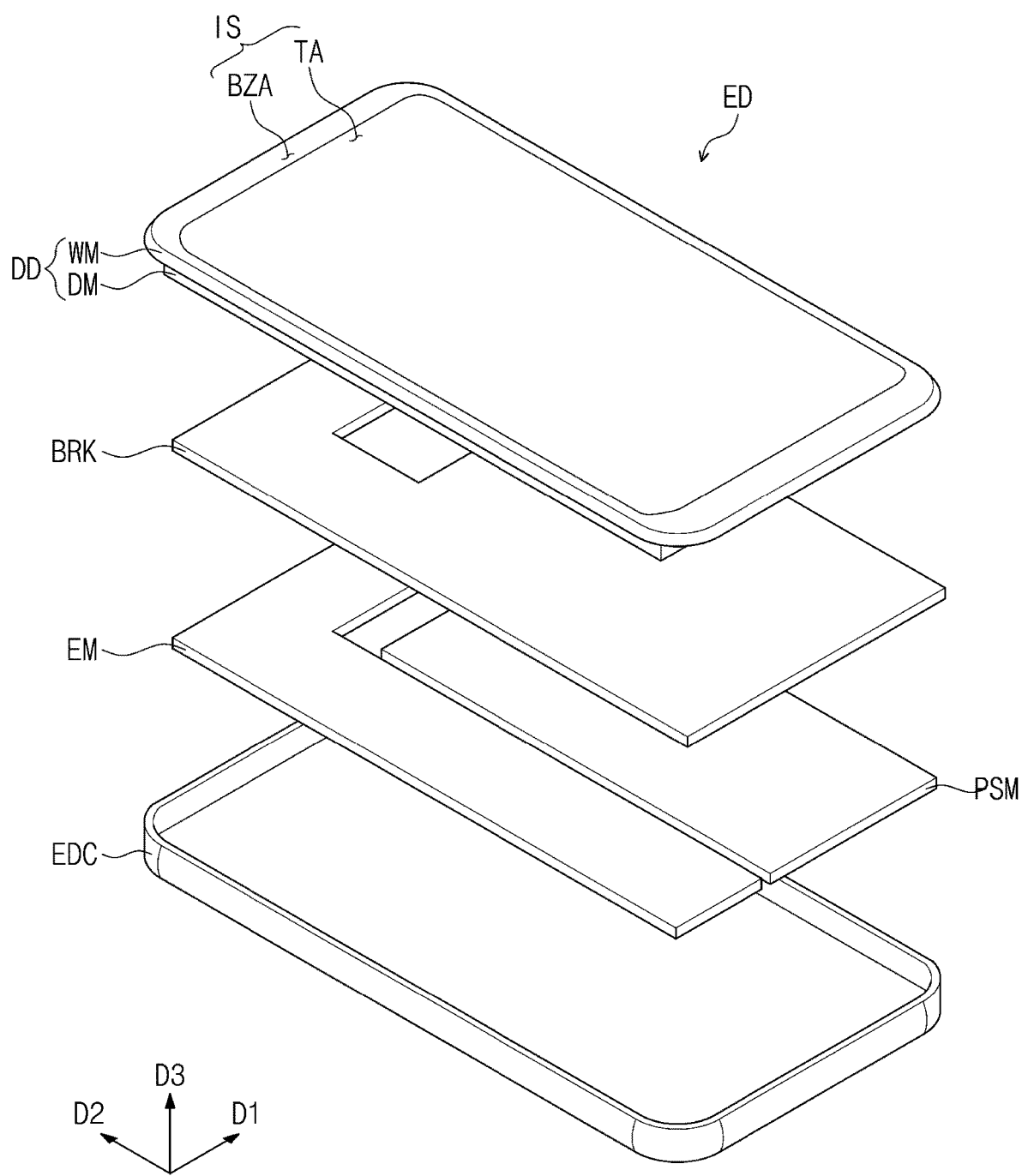
FIG. 2 is an exploded perspective view of the electronic device shown in FIG. 1.
Figure 3:
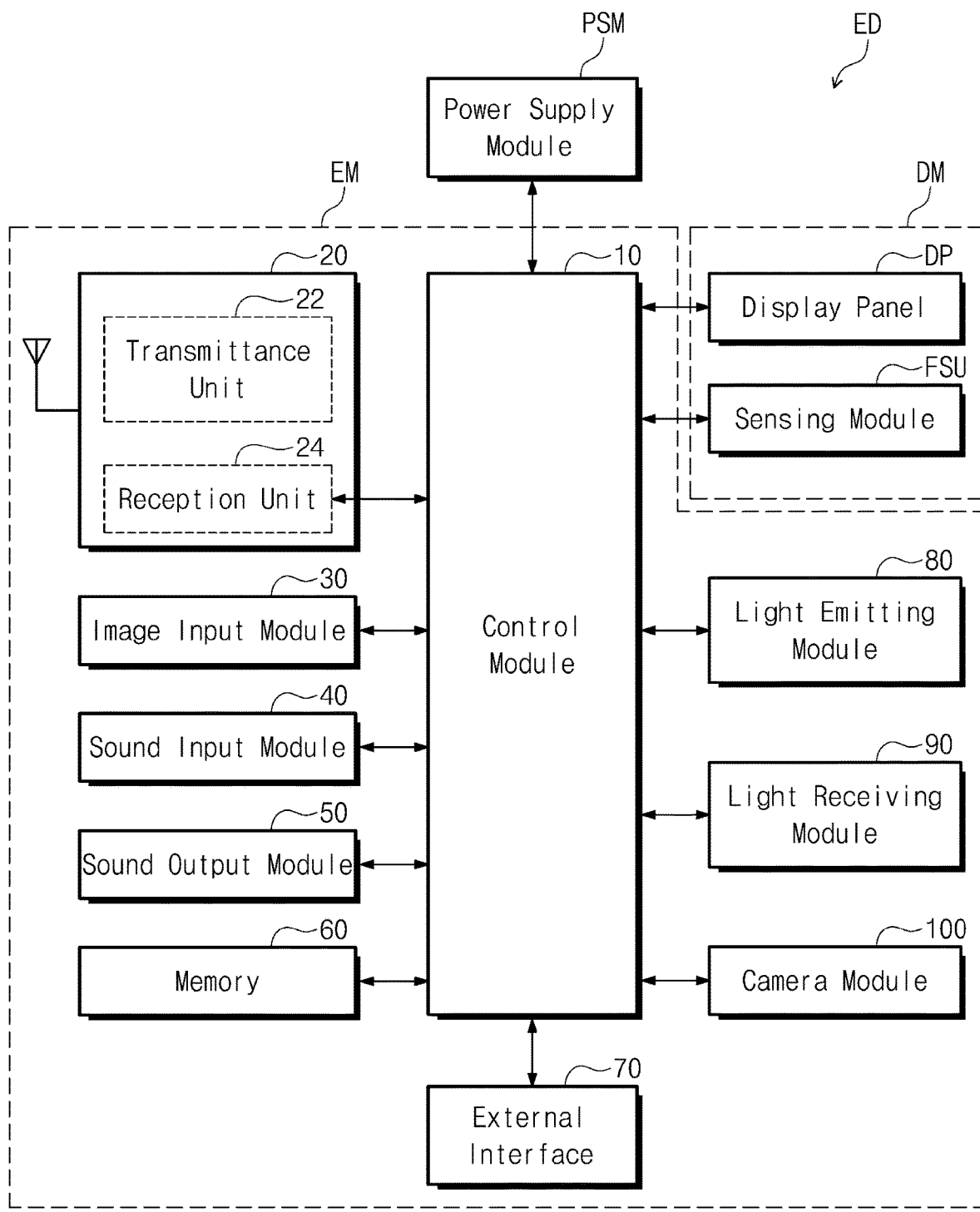
FIG. 3 is a block diagram of the electronic device shown in FIG. 1.

FIG. 1 is a perspective view of an electronic device according to an embodiment of the present disclosure. FIG. 2 is an exploded perspective view of the electronic device shown in FIG. 1. FIG. 3 is a block diagram of the electronic device shown in FIG. 1.

Referring to FIG. 1 to FIG. 3, an electronic device ED may be a device that is activated according to an electrical signal. The electronic device ED may include various suitable embodiments. For example, the electronic device ED may include a tablet PC, a notebook computer, a computer, a smart television, and/or the like. In the present embodiment, a smart phone is exemplarily illustrated as the electronic device ED, but the present disclosure is not limited thereto.

A display surface IS on which an image IM is displayed is parallel (e.g., substantially parallel) to a surface defined by a first direction axis D1 and a second direction axis D2. The display surface IS may include a transmissive area TA and a bezel area BZA adjacent to the transmissive area TA. In FIG. 1, as an example of the image IM, an Internet search window is shown. As an example, the transmissive area TA may have a quadrangular shape. The bezel area BZA may at least partially surround the transmissive area TA. In other words, the bezel area BZA forms an edge of the display surface IS. However, this is only exemplary, and the bezel area BZA may be adjacent to only one side of the transmissive area TA, or may be omitted. An electronic device according to an embodiment of the present disclosure may include various suitable embodiments, but is not limited to any one embodiment.

The normal direction of the display surface IS, for example, the thickness direction of the electronic device ED, is indicated by a third direction axis D3. A front surface (or an upper surface, or a first surface) and a back surface (or a lower surface or a second surface) of each member may be defined with respect to a direction in which the image IM is displayed. However, directions indicated by the first to third direction axes D1, D2, and D3 are a relative concept, and may be converted to different directions. Hereinafter, first to third directions refer to the same directions indicated by the first to third direction axes D1, D2, D3, respectively, and refer to the same reference numerals.

The electronic device ED may sense a user's fingerprint FNG that is applied from the outside. Accordingly, the electronic device ED may provide a fingerprint sensing area FSA to the display surface IS. In the present embodiment, the fingerprint sensing area FSA is shown in the transmissive area TA on which the image IM is displayed. However, this is only exemplary, and the fingerprint sensing area FSA may be in the bezel area BZA, in all regions of the transmissive area TA, or in all regions of the display surface IS. The electronic device ED may sense a user's fingerprint FNG that is provided to the fingerprint sensing area FSA.

The user's fingerprint FNG may include the surface state of a user's hand, for example, surface uniformity, surface curvature, and/or the like. However, this is only exemplary, and when input of an inanimate object is provided to the electronic device ED, the electronic device ED may sense the surface information of the inanimate object.

When viewing the configurations of the electronic device ED with reference to FIG. 2 and FIG. 3, the electronic device ED may include a display device DD, an electronic module EM, a power supply module PSM, a bracket BRK, and an external case EDC. In FIG. 2 and FIG. 3, the above configurations are simply shown.

The display device DD may include a window WM and a display module DM. As shown in FIG. 1, in a coupled state, the window WM constitutes the appearance of the electronic device ED. The window WM protects internal components of the electronic device ED from external impact, and may substantially provide the display surface IS of the electronic device ED.

The display module DM is on a back surface of the window WM. The display module DM may include a display panel DP. The display panel DP may substantially generates the image IM. The image IM generated by the display panel DP is displayed on the display surface IS through the transmissive area TA and is viewed from the outside by the user.

The sensing module FSU senses the user's fingerprint FNG applied from the outside. As described above, the sensing module FSU may sense the user's fingerprint FNG (hereinafter including the surface information of an inanimate object) provided in the sensing area FSA (see FIG. 1). Further description thereof is provided herein below.

Figure 4:
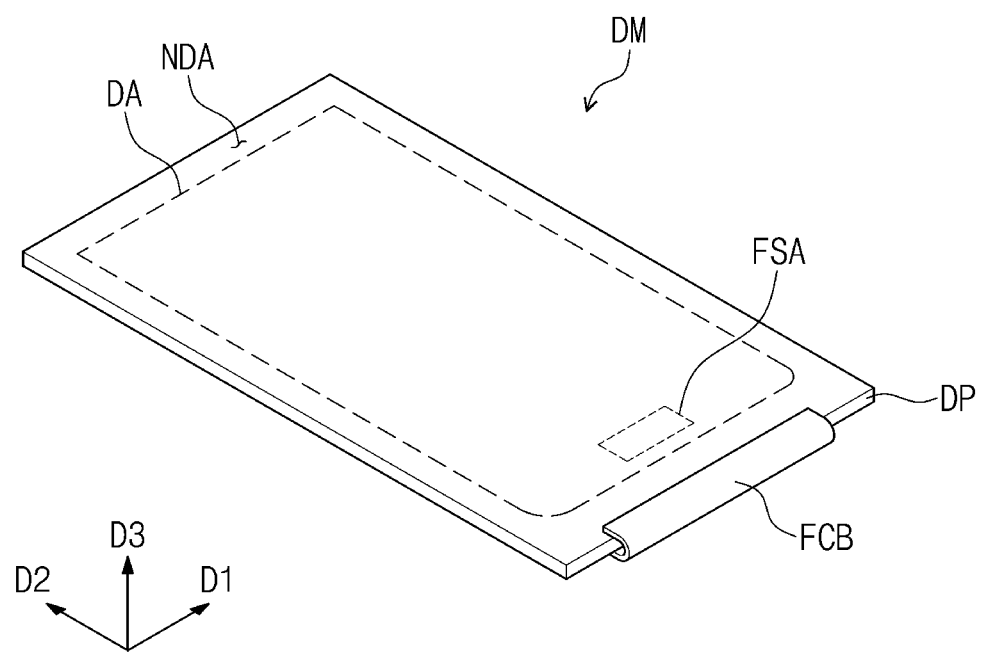
FIG. 4 is an assembled perspective view of the display device shown in FIG. 2.

In some embodiments, the display module DM may be electrically coupled to an electronic module EM through a circuit board FCB (refer to FIG. 4). The display module DM may receive information on the image IM to be displayed from the electronic module EM, or may provide information on the sensed fingerprint FNG to the electronic module EM to provide information processed based on the information to the user.

The power supply module PSM supplies power required for the overall operation of the electronic device ED. The power supply module PSM may include any suitable battery module available in the art.

The bracket BRK is coupled to the display device DD and/or the external case EDC and partitions the internal space of the electronic device ED. The bracket BRK provides a space in which other components may be located. Also, the bracket BRK may support the display device DD so that the display device DD is fixed without (or substantially without) being shaken. The bracket BRK may have a coupling groove corresponding to the shape of the electronic module EM so that the electronic module EM is fixed. The bracket BRK includes a metal or plastic member. One bracket BRK is exemplarily shown, but the electronic device ED may include a plurality of brackets BRK.

The external case EDC may be coupled to the bracket BRK and/or the display device DD. In the present embodiment, the external case EDC and the window WM constitute the appearance of the electronic device ED. In the present embodiment, the external case EDC composed of one body is exemplarily shown. However, the external case EDC may include a plurality of bodies to be assembled together. The external case EDC may include a plurality of frames and/or plates made of glass, plastic, and/or metal.

The electronic module EM includes a mother board and various functional modules. The various functional modules are mounted on the mother board and perform various suitable functions for operating the electronic module EM. The mother board may be electrically coupled to the display device DD through a connector. Here, the mother board may include a printed circuit board of a rigid type (e.g., a rigid printed circuit board).

The electronic module EM may include a control module 10, a wireless communication module 20, an image input module 30, a sound input module 40, a sound output module 50, a memory 60, an external interface 70, a light emitting module 80, a light receiving module 90, a camera module 100, and/or the like. Some of the above-described modules may not be mounted on the mother board, and may be electrically coupled to the mother board through the flexible printed circuit board.

The control module 10 controls the overall operation of the electronic device ED. The control module 10 may be a microprocessor. For example, the control module 10 activates or deactivates the display device DD. The control module 10 may control the image input module 30, the sound input module 40, the sound output module 50 and the like on the basis of a touch signal received from the display device DD.

The wireless communication module 20 may be configured to transmit/receive wireless signals with other terminals using Bluetooth or a Wi-Fi line. The wireless communication module 20 may be configured to transmit/receive voice signals using a general communication line. The wireless communication module 20 includes transmittance unit 22 configured to modulate and transmit a signal to be transmitted, and a reception unit 24 configured to demodulate a received signal.

The image input module 30 is configured to process an image signal to convert the same into image data that can be used to display an image on the display device DD. The sound input module 40 is configured to receive an external sound signal through a microphone in a recording mode, a voice recognition mode, and the like, and converts the received signal into electrical voice data. The sound output module 50 converts sound data received from the wireless communication module 20 or sound data stored in the memory 60 and outputs the converted data to the outside.

The external interface 70 serves as an interface to be coupled to an external charger, a wired/wireless data port, a card socket (for example, a memory card, a SIM/UIM card), and the like.

The light emitting module 80 may be configured to generate and output light. The light emitting module 80 may output infrared rays. The light emitting module 80 may include an LED element. The light receiving module 90 may sense infrared rays.

The light receiving module 90 may be activated when an infrared ray of a set or predetermined level or higher is sensed. The light receiving module 90 may include a complementary metal-oxide-semiconductor (CMOS) sensor. After infrared light generated from the light emitting module 80 is outputted, infrared light reflected by an external object (such as a user's finger or face) may be incident on the light receiving module 90. The camera module 100 captures external images.

Figure 5:
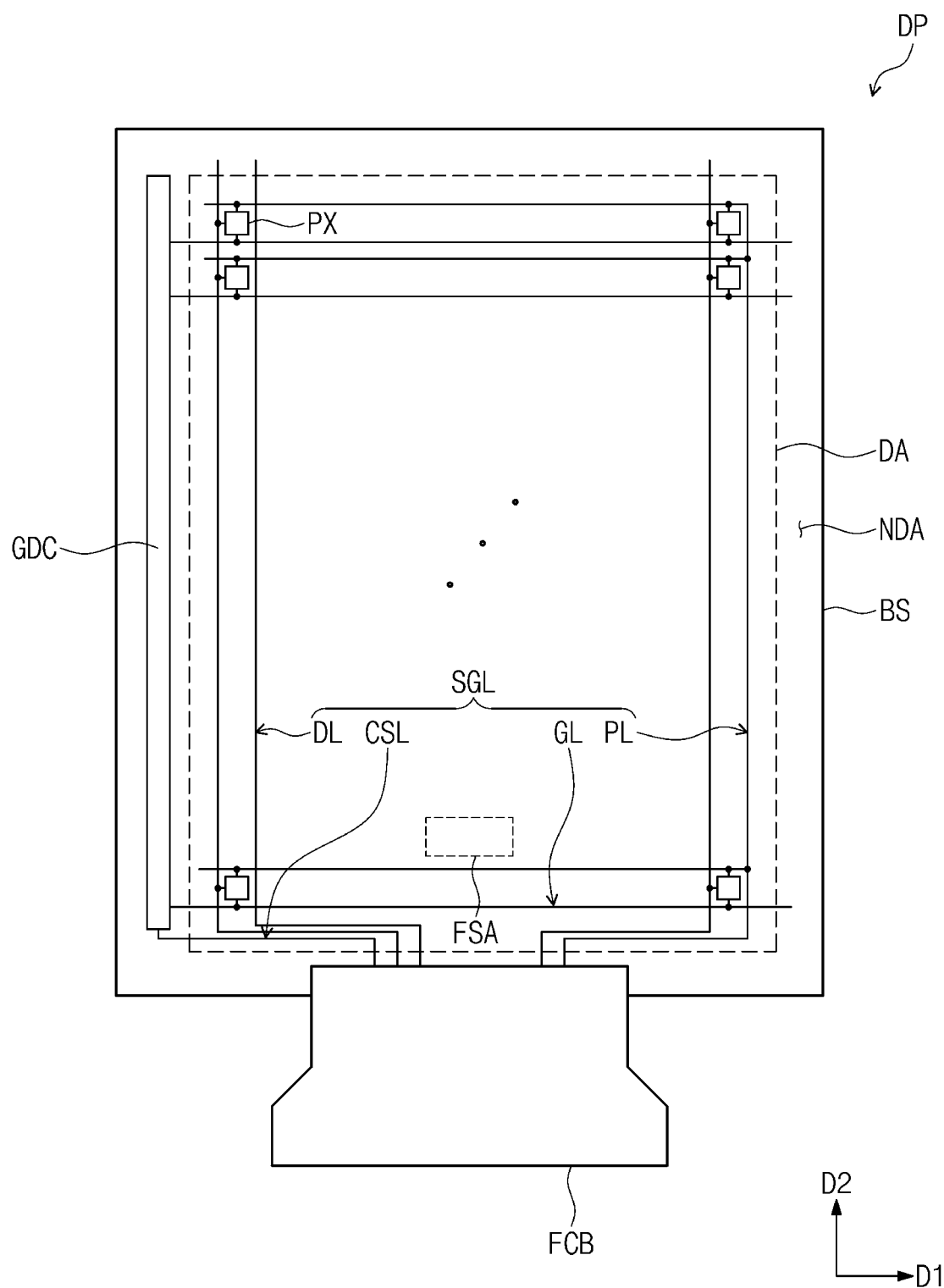
FIG. 5 is a plan view of the display panel shown in FIG. 4.
Figure 6:
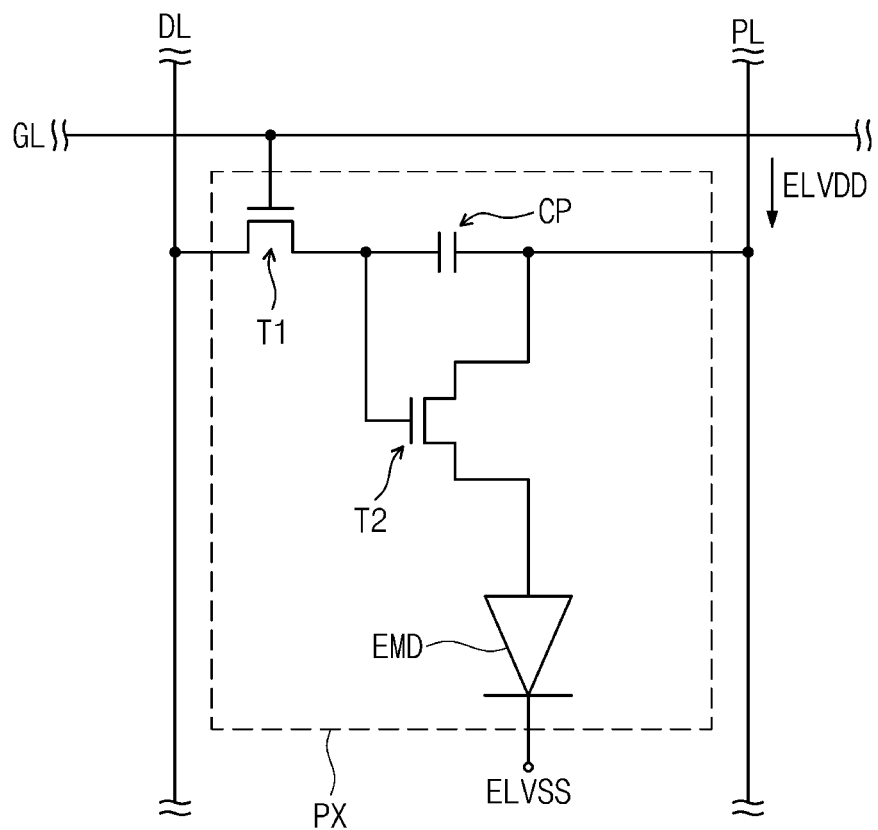
FIG. 6 is an equivalent circuit diagram of the pixels shown in FIG. 5.

FIG. 4 is an assembled perspective view of the display device shown in FIG. 2. FIG. 5 is a plan view of the display panel shown in FIG. 4. FIG. 6 is an equivalent circuit diagram of the pixels shown in FIG. 5.

Referring to FIG. 4 and FIG. 5, the display module DM includes the display panel DP and a circuit board FCB.

The display panel DP includes a base substrate BS, a plurality of signal lines DL, GL, and PL, and a plurality of pixels PX. In the present embodiment, to facilitate the description, a signal circuit diagram of one pixel PX is schematically shown.

The base substrate BS is divided into a display area DA and a peripheral area NDA on a plane. In the present embodiment, a back surface of the base substrate BS may be provide as a back surface of the display panel DP.

The display area DA may be a region on which the image IM (see FIG. 1) is displayed. The display panel DP activates the display area DA according to an electrical signal. The image IM is displayed on the activated display area DA. The transmissive area TA (shown in FIG. 1) may overlap at least the entire (or substantially the entire) display area DA.

The peripheral area NDA is adjacent to the display area DA. The peripheral area NDA may at least partially or completely surround the edge of the display area DA. However, this is only exemplary, and the peripheral area NDA may be adjacent to a portion of the edge of the display area DA, but is not limited to any one embodiment.

Various suitable signals lines for providing an electrical signal to the display area DA, or an electronic element may be in the peripheral area NDA. The peripheral area NDA is covered by the bezel area BZA (shown in FIG. 1) and may not be viewed from the outside.

A plurality of signal lines SGL, the pixel PX, and a plurality of display pads are on the base substrate BS. The signal lines SGL may include a gate line GL, a data line DL, and a power line PL. The gate line GL, the data line DL, and the power line PL may each be configured to transmit a different signal.

The gate line GL is extended along a first direction D1. The gate line GL may be provided in plurality and arranged along a second direction D2 while being spaced apart from each other. However, to facilitate the description, a single gate line GL is exemplarily shown.

The display module DM is on the base substrate BS and may further include a driving circuit GDC for providing an electrical signal to the gate line GL. The driving circuit GDC may include a plurality of thin film transistors formed through the same (e.g., substantially the same) process of a driving circuit of the pixels PX, for example, a Low Temperature Polycrystalline Silicon (LTPS) process or a Low Temperature Polycrystalline Oxide (LTPO) process. The signal lines SGL may further include a control signal line CSL for providing control signals to the driving circuit GDC.

The data line DL is extended along the second direction D2. The data line DL may be electrically insulated from the gate line GL. The data line DL may be provided in plurality and arranged along the first direction D1 while being spaced apart from each other. However, to facilitate the description, a single data line DL is exemplarily shown.

The power line PL is extended along the second direction D2. The power line PL may be electrically insulated from the data line DL. The power line PL may be provided in plurality and arranged along the first direction D1 while being spaced apart from each other. However, to facilitate the description, a single power line PL is exemplarily shown. The power line PL may provide a power signal to the pixel PX.

The pixel PX is in the display area DA. The pixel PX may be provided in plurality and may each be coupled to a corresponding signal line. However, to facilitate the description, a single pixel PX is exemplarily shown. The pixel PX displays light in accordance with an electrical signal to implement the image IM.

Referring to FIG. 6, the pixel PX may include a first thin film transistor T1, a second thin film transistor T2, a capacitor CP, and a light emitting element EMD. The first thin film transistor T1, the second thin film transistor T2, the capacitor CP, and the light emitting element EMD are electrically coupled.

The first thin film transistor T1 may be a switching element for controlling turn-on and turn-off of the pixel PX. The first thin film transistor T1 is coupled to the gate line GL and the data line DL. The first thin film transistor T1 is turned on by a gate signal provided through the gate line GL, and provides a data signal provided through the data line DL to the capacitor CP.

The capacitor CP charges a voltage corresponding to a potential difference between a first power signal ELVDD provided from the power supply line PL and a signal provided from the thin film transistor T1. The second thin film transistor T2 provides the first power signal ELVDD provided from the power supply line PL corresponding to the voltage charged in the capacitor CP to the light emitting element EMD.

The light emitting element EMD may generate light or control the amount of light according to an electrical signal. For example, the light emitting element EMD may include an organic light emitting element, a quantum dot light emitting element, an electrophoretic element, or an electrowetting element.

The light emitting element EMD is coupled to a power terminal to be provided with a second power signal ELVSS different from the first power signal ELVDD provided by the power line PL. A driving current corresponding to the difference between an electrical signal provided from the second thin film transistor T2 and the second power signal ELVSS flows the light emitting element EMD, and the light emitting element EMD may generate light corresponding to the driving current.

Meanwhile, this is only exemplary, and the pixel PX may include electric elements having various configurations and arrangements, but the present disclosure is not limited to any one embodiment.

The circuit board FCB is coupled to one side of the display panel DP. The circuit board FCB provides an electrical signal to the display panel DP. The circuit board FCB may generate a signal for controlling the image IM or a power signal and provide the same to the display panel DP. The circuit board FCB may be a flexible printed circuit board. The circuit board FCB may have a driving element mounted thereon.

The circuit board FCB is electrically and physically coupled to the display panel DP through an adhesive member (for example, an anisotropic conductive film). The circuit board FCB may include signal lines. The circuit board FCB may be bent toward the back surface of the base substrate BS after being coupled to the display panel DP.

Figure 7:
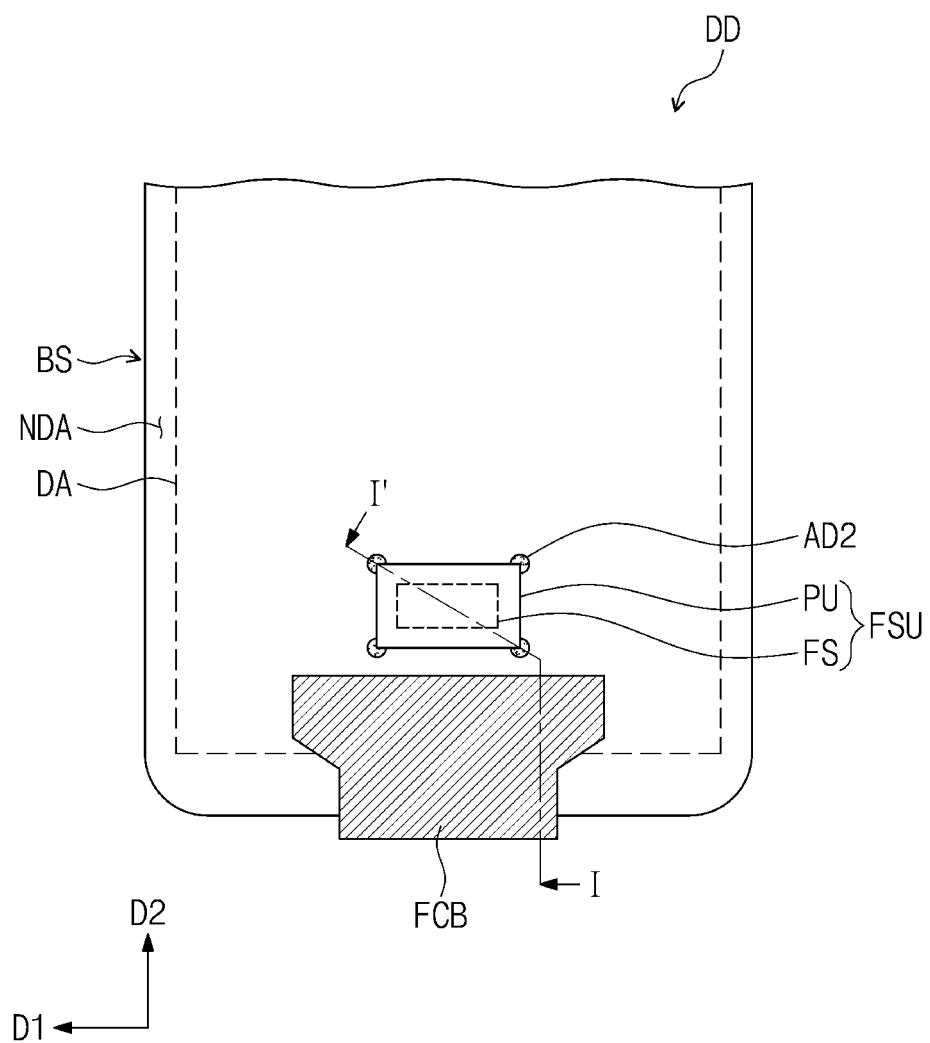
FIG. 7 is a plan view showing a back surface of a display device according to an embodiment of the present disclosure.
Figure 8:
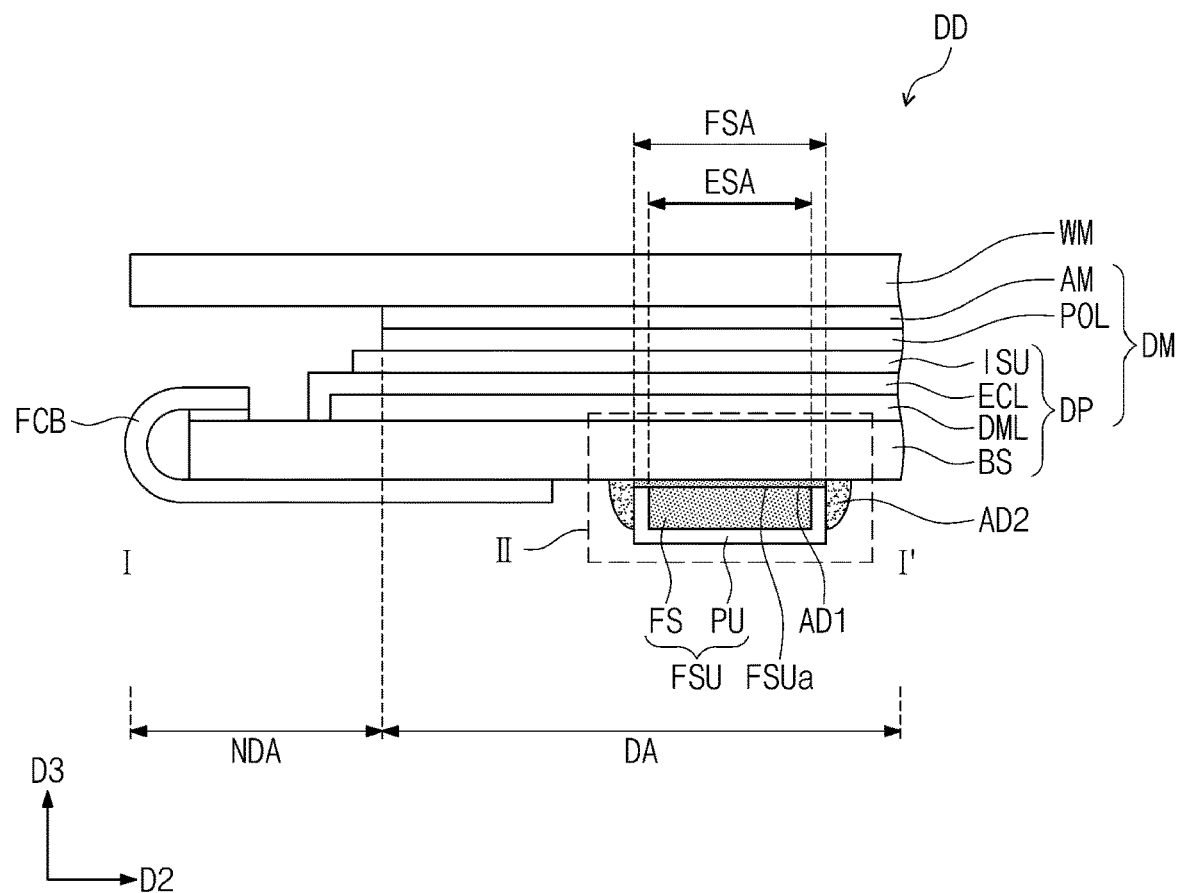
FIG. 8 is a cross-sectional view taken along line I-I' shown in FIG. 7.
Figure 9:
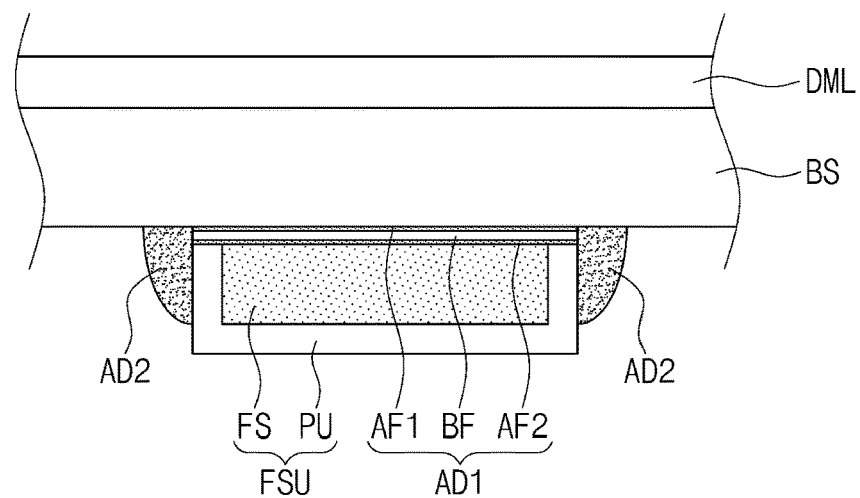
FIG. 9 is an enlarged view of region II shown in FIG. 8.

FIG. 7 is a plan view showing a back surface of a display device according to an embodiment of the present disclosure. FIG. 8 is a cross-sectional view taken along line I-I' shown in FIG. 7. FIG. 9 is an enlarged view of region II shown in FIG. 8.

Referring to the display device DD shown in FIG. 7 to FIG. 9, a circuit board FCB and a sensing module FSU may be on a back surface of a display panel DP. Here, the back surface of the display panel DP may be a back surface of a base substrate BS.

The sensing module FSU may be on the back surface of the display panel DP in correspondence with a fingerprint sensing area FSA. The sensing module FSU may overlap the fingerprint sensing area FSA. The sensing module FSU may include a sensor FS and a package PU for mounting the sensor FS.

According to an embodiment of the present disclosure, the sensor FS may be provided as a fingerprint recognition sensor, and the sensor FS may recognize a fingerprint based on an ultrasound method (e.g., by ultrasonically sensing the fingerprint by utilizing ultrasonic waves). The sensor FS is described as being provided as a fingerprint recognition sensor, but embodiments of the present disclosure are not limited thereto.

The sensor FS is mounted on the package PU and may face the back surface of the display panel DP. The sensor FS may include an effective sensing area ESA capable of recognizing a fingerprint. The package PU may pack (e.g., mount or house) the sensor FS such that the effective sensing area ESA is exposed. The fingerprint sensing area FSA may overlap the effective sensing area ESA. The effective sensing area ESA may be included in the fingerprint sensing area FSA.

The display device DD includes a first adhesive member AD1 interposed between the back surface of the display module DP and the sensing module FSU. On the back surface, the first adhesive member AD1 may cover the effective sensing area ESA of the sensor FS.

The sensing module FSU and the back surface of the display panel DP may be spaced apart at a set or predetermined interval. A space formed between the sensing module FSU and the back surface of the display module DP, which are spaced apart from each other, may be at least partially filled with the first adhesive member AD1.

The first adhesive member AD1 may partially overlap a portion of the package PU. For example, one surface of the first adhesive member AD1 may be in contact with the package PU and the effective sensing area ESA of the sensor FS.

Accordingly, ultrasound (e.g., ultrasonic waves) reflected from the user's fingerprint FNG (shown in FIG. 1) may pass through the first adhesive member AD1 and be incident on the sensor FS. For example, the sensor FS receives the ultrasound (e.g., ultrasonic waves) that has passed through the first adhesive member AD1.

As shown in FIG. 9, the first adhesive member AD1 includes a base layer BF, a first adhesive layer AF1 on a first surface of the base layer BF, and a second adhesive layer AF2 on a second surface facing the first surface of the base layer BF. Each of the first adhesive layer AF1 and the second adhesive layer AF2 may contain any one selected from a pressure sensitive adhesive film, an optical transparent adhesive film, and an adhesive resin.

The first adhesive layer AF1 may be attached to the back surface of the display module DM, and the second adhesive layer AF2 may be attached to one surface of the sensing module FSU. One surface of the sensing module FSU may include the effective sensing area ESA. The one surface including the effective sensing area ESA may be defined as a sensing surface FSUa. The second adhesive layer AF2 may be attached to the sensing surface FSUa of the sensing module FSU. Each of the first adhesive layer AF1 and the second adhesive layer AF2 may have an adhesive force of 300 gf/in or greater.

The base layer BF may contain a polymer material. The base layer BF may be a polyester material or a polyimide material. The base layer BF may have a modulus (e.g., an elastic modulus or Young's modulus) in a range of 150 MPa to 10 GPa. When the base layer BF having a high modulus (e.g., an elastic modulus or Young's modulus) is used, the deformation of the first adhesive member AD1 may be minimized or reduced. Also, wrinkling between the first adhesive member AD1 and the display panel DP due to the deformation of the first adhesive member AD1 may be reduced.

The first adhesive member AD1 may have a thickness in a range of 5 µm to 200 µm. As the first adhesive member AD1 is thicker, the sensitivity of the sensing module FSU may be reduced. Therefore, the first adhesive member AD1 may have a thickness in the above-described range.

As such, as the first adhesive member AD1 for attaching the sensing module FSU to the back surface of the display module DM is attached so as to cover the entire (e.g., substantially the entire) effective sensing area ESA, the electronic device ED may have an enhanced adhesive force between the sensing module FSU and the display module DM.

Also, as the first adhesive layer AF1 and the second adhesive layer AF2 having high adhesive force are on both sides of the base layer BF, the adhesive force between the first adhesive member AD1 and the display module DM and the adhesive force between the first adhesive member AD1 and the sensing module FSU may be enhanced, so that the sensing module FSU may be stably fixed to the display module DM.

The display device DD may further include a second adhesive member AD2. The second adhesive member AD2 may be attached to a portion of the sensing module FSU and the back surface of the display module DM. For example, the second adhesive member AD2 may be attached to a side surface of the sensing module FSU, a side surface of the first adhesive member AD1, and the back surface of the display module DM.

The second adhesive member AD2 may be attached to four corner portions in which two sides of the sensing module FSU meet. A structure of the second adhesive member AD2, however, is not limited thereto. The second adhesive member AD2 may be formed in a ring shape so as to surround a side surface of the sensing module FSU.

The second adhesive member AD2 may include a photoinitiator. The photoinitiator may be configured to be activated by ultraviolet light.

For example, the photoinitiator included in the second adhesive member AD2 may be any one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide), [1-(4-phenylsulfanylbenzoyl)heptylideneamino]benzoate, [1-[9-ethyl-6-(2-methylbenzoyl)carbazol-3-yl]ethylideneamino] acetate, and Bis(2,4-cyclopentadienyl)bis[2,6-difluoro-3-(1-pyrryl)phenyl] titanium(IV).

By additionally fixing the sensing module FSU to the display module DM through the second adhesive member AD2, the adhesive force between the sensing module FSU and the display module DM may be further improved.

The circuit board FCB may be spaced apart from the sensing module FSU at a set or certain interval along the second direction D2. The circuit board FCB may be electrically coupled to the sensing module FSU, and as an example, may be coupled with each other through a flexible printed circuit board and/or the like.

As shown in FIG. 8, the display panel DP may include the base substrate BS, a display element layer DML, and an encapsulation layer ECL.

The base substrate BS supports overall configurations of the display panel DP, and may include a flexible material. For example, the base substrate BS may include a plastic substrate, a glass substrate, or an organic/inorganic composite material substrate. In some embodiments, the base substrate BS may be a laminated structure including a plurality of insulation layers. A plastic substrate may include at least one selected from an acryl-based resin, a methacryl-based resin, polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

The display element layer DML may include a plurality of insulation layers, a plurality of conductive layers, and a semiconductor layer. The plurality of conductive layers may constitute signal lines or a control circuit of a pixel. The display element layer DML may further include a display element. The display element may include, for example, organic light emitting diodes. However, embodiments of the present disclosure are not limited thereto. According to the type or kind of the display panel DP, the display element may include inorganic light emitting diodes or organic-inorganic hybrid light emitting diodes.

The encapsulation layer ECL encapsulates the display element layer DML. As an example, the encapsulation layer ECL may be an encapsulation substrate. The encapsulation layer ECL protects the display element layer DML from foreign materials such as moisture, oxygen, and/or dust particles.

The display panel DP may further include an input sensing unit ISU. The input sensing unit ISU may be on the encapsulation layer ECL.

In FIG. 8, the input sensing unit ISU is directly formed on the encapsulation layer ECL by a continuous (e.g., substantially continuous) process. However, embodiments of the present disclosure are not limited thereto. For example, between the input sensing unit ISU and the encapsulation layer ECL, an adhesive member may be provided, and the input sensing unit ISU and the encapsulation layer ECL may be attached to each other by the adhesive member.

In some embodiments, the display module DM further includes a polarizing layer POL and a window adhesive member AM.

The polarizing layer POL is between the display panel DP and the window WM. The polarizing member POL polarizes external light incident through the window WM to prevent circuit elements included in the display module DM from being viewed to the outside (or to reduce the outside visibility of the circuit elements). Depending on an embodiment, the polarizing layer POL may be omitted. The window adhesive member AM is between the polarizing layer POL and the window WM to attach the polarizing layer POL and the window WM. For example, the window adhesive member AM may be an optically clear adhesive film, an optically clear resin, or a pressure sensitive adhesive film.

Figure 10A:
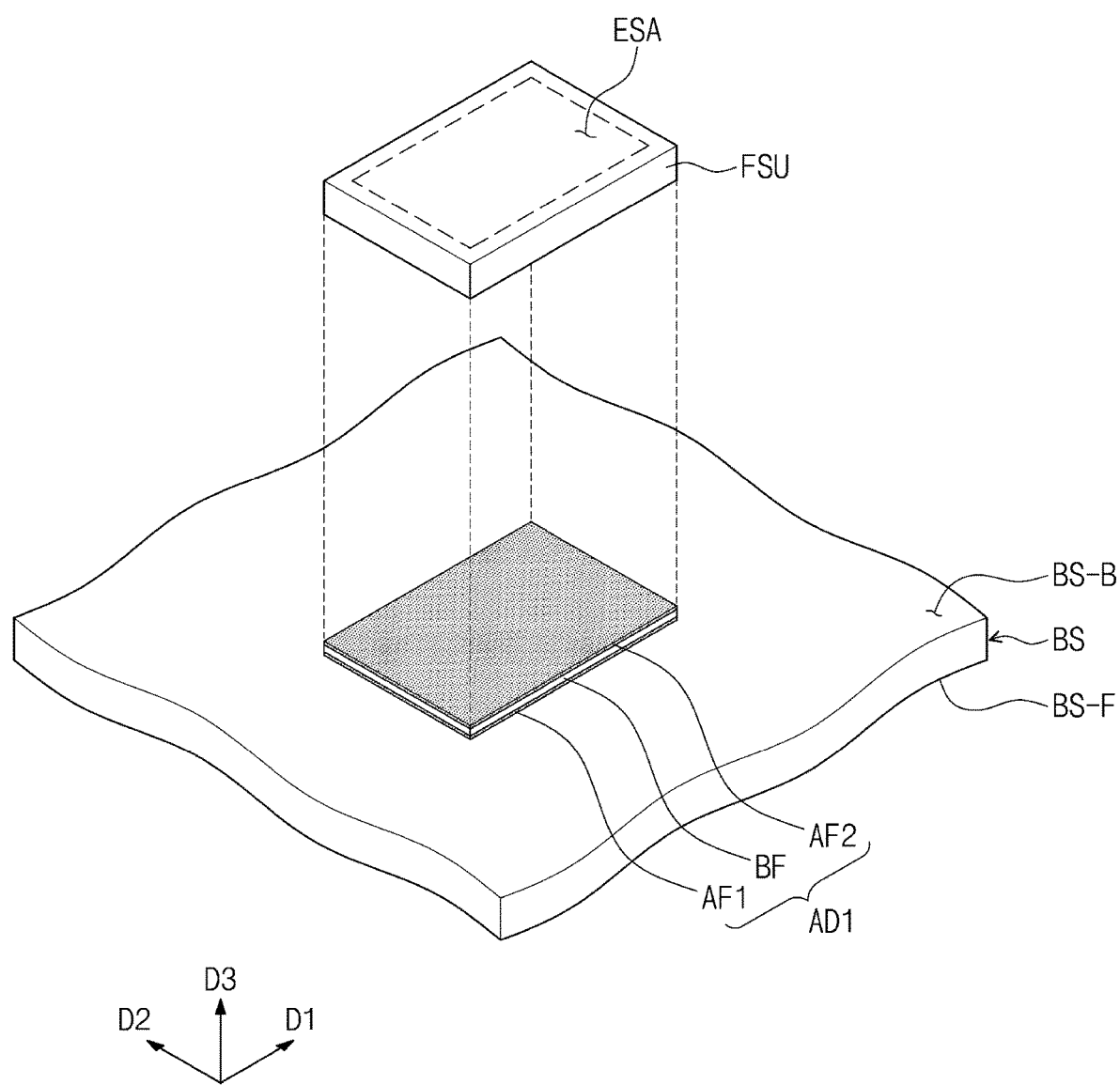
FIG. 10A and FIG. 10B are process diagrams showing an attachment process of the sensing module shown in FIG. 9.
Figure 10B:
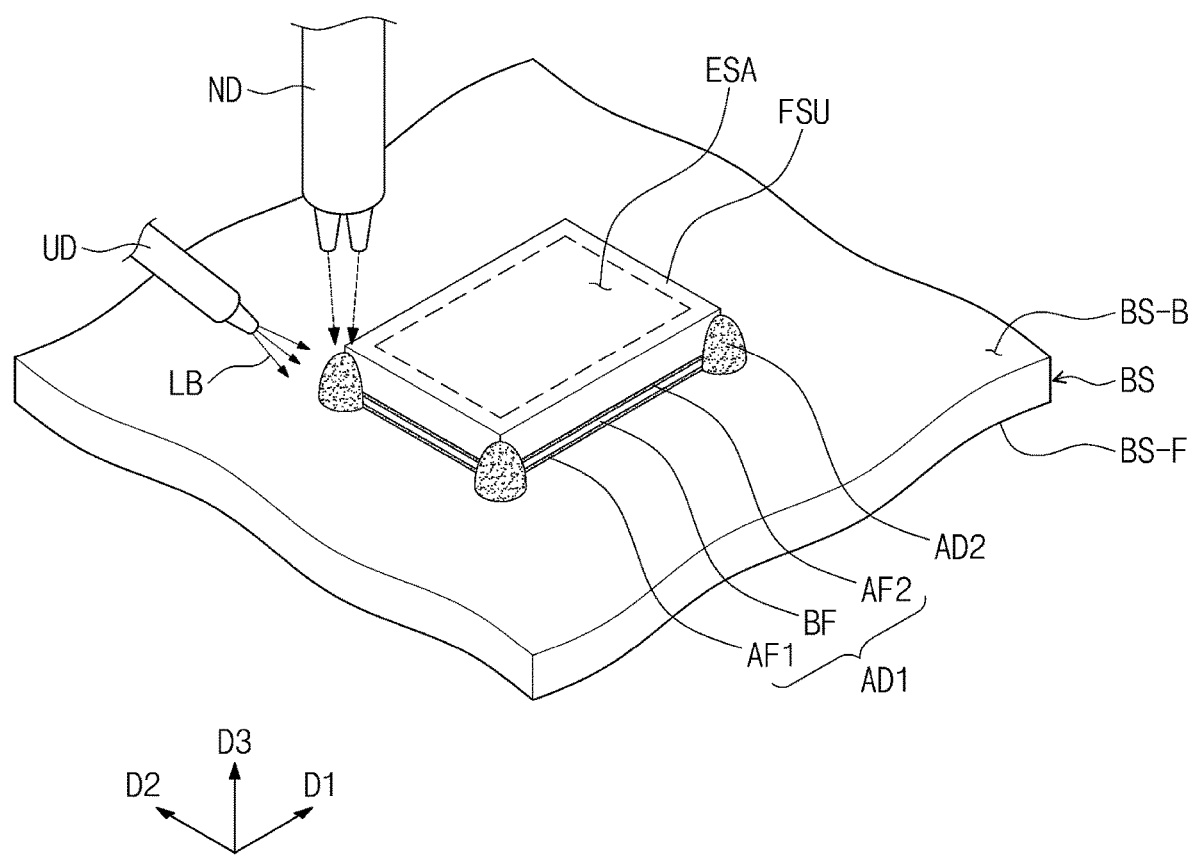

FIG. 10A and FIG. 10B are process diagrams showing an attachment process of the sensing module shown in FIG. 9.

Referring to FIG. 9 and FIG. 10A, on a back surface BS-B of the base substrate BS, the first adhesive member AD1 is attached. The back surface BS-B is opposite to a front surface BS-F of the base substrate BS. The first adhesive member AD1 may be attached to the back surface BS-B of the base substrate BS in correspondence to the fingerprint sensing area FSA (shown in FIG. 9). The first adhesive layer AF1 of the first adhesive member AD1 may be attached to the back surface BS-B of the base substrate BS.

As an example, the first adhesive member AD1 is shown to have a quadrangular shape, but is not limited thereto. The shape of the first adhesive member AD1 may be variously modified. The shape of the first adhesive member AD1 may be variously modified according to the shape of the sensing module FSU.

In some embodiments, the sensing module FSU is on the first adhesive member AD1. The sensing module FSU may overlap the first adhesive member AD1. The first adhesive member AD1 may overlap the effective sensing area ESA of the sensing module FSU.

Referring to FIG. 9 and FIG. 10B, the sensing module FSU may be attached to the second adhesive layer AF2 of the first adhesive member AD1.

Here, the order in which the first adhesive member AD1 is first attached to the base substrate BS, and then the sensing module FSU is attached to the first adhesive member AD1 is shown. However, the present disclosure is not limited thereto. For example, the second adhesive layer AF2 of the first adhesive member AD1 may be first attached to the sensing module FSU, and then the first adhesive member AD1 may be attached to the back surface BS-B of the base substrate BS.

Referring to FIG. 9 and FIG. 10B, an application device ND may apply a photocurable adhesive material to overlap a portion of the sensing module FSU and the first adhesive member AD1.

According to an embodiment of the present disclosure, the photocurable adhesive material may include a photoinitiator. The photocurable adhesive material may overlap four corners of the sensing module FSU. The photocurable adhesive material may partially cover a side surface of the sensing module FSU, a side surface of the first adhesive member AD1, and the back surface BS-B of the display module DM.

Next, ultraviolet light LB may be irradiated to the photocurable adhesive material. The ultraviolet light LB may be irradiated by a light irradiation device UD. As the ultraviolet light LB is irradiated to the photocurable adhesive material, the photocurable adhesive material is cured, and thus, the second adhesive member AD2 may be formed. As a result, the first adhesive member AD1 and the sensing module FSU may be firmly fixed to the base substrate BS by the second adhesive member AD2.

Figure 11:
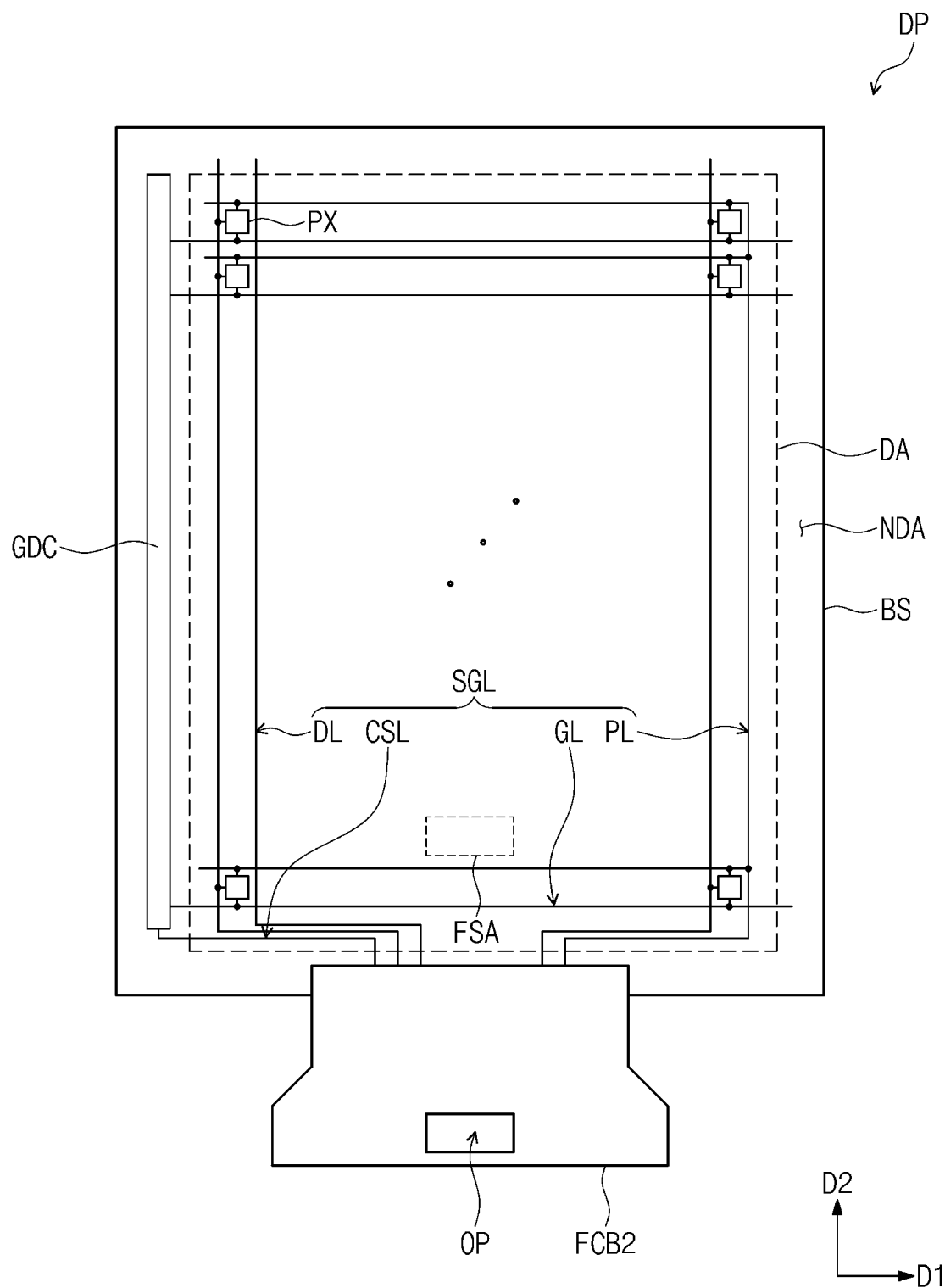
FIG. 11 is a plan view of a display device according to another embodiment of the present disclosure.
Figure 12:
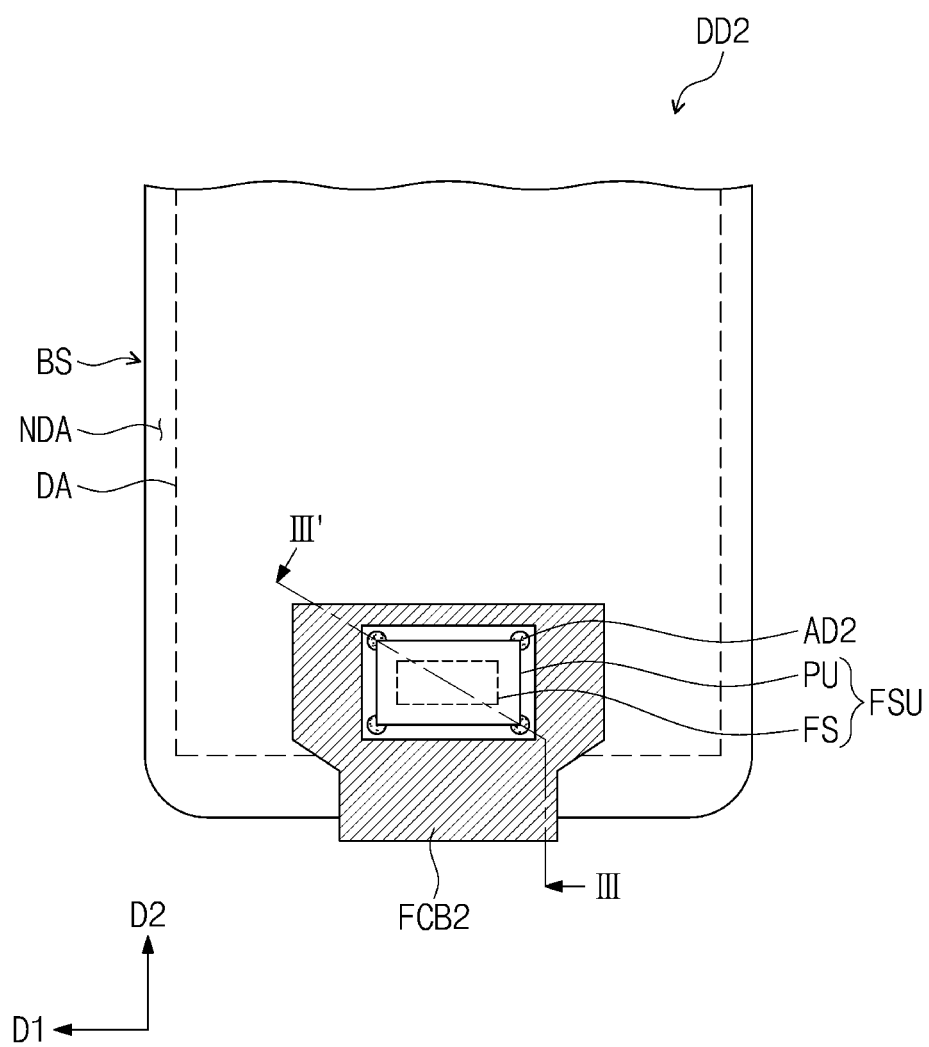
FIG. 12 is a plan view showing a back surface of the display device shown in FIG. 11.
Figure 13:
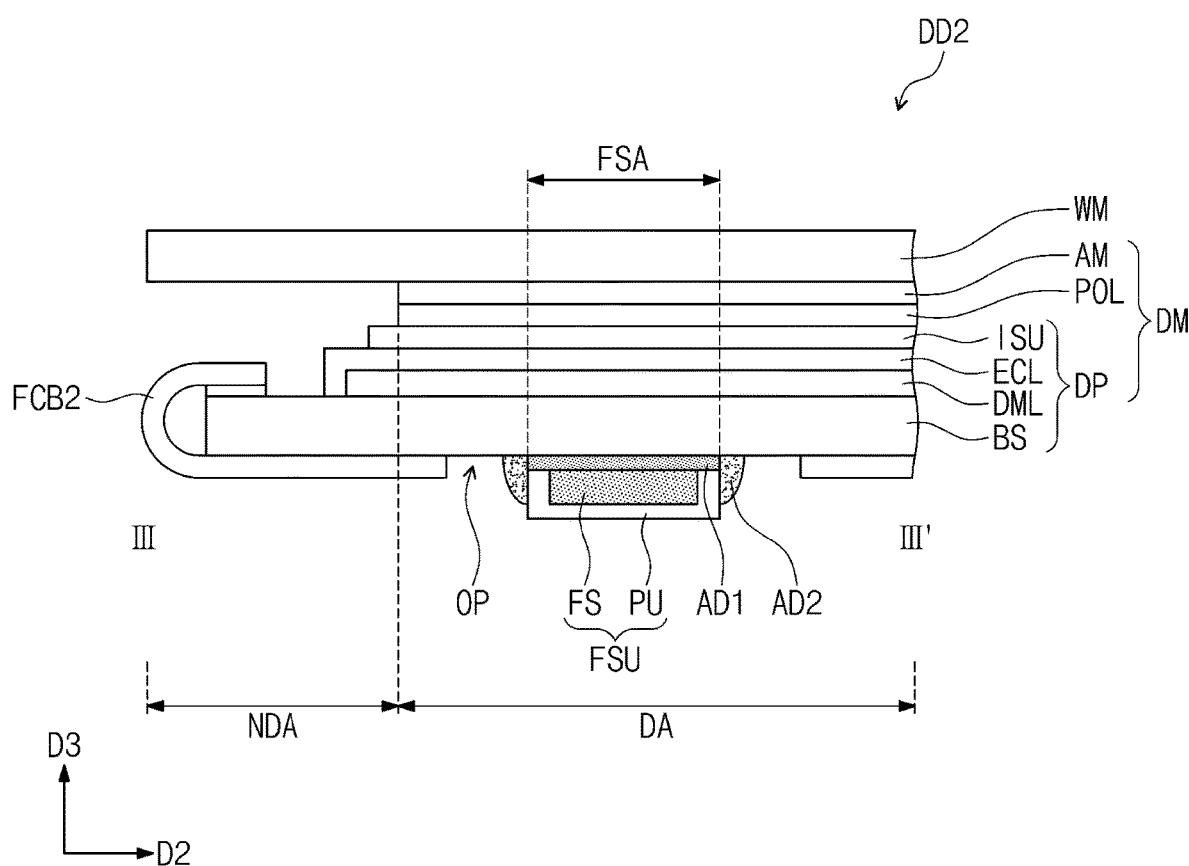
FIG. 13 is a cross-sectional view taken along line III-III' shown in FIG. 12.

FIG. 11 is a plan view of a display device according to another embodiment of the present disclosure. FIG. 12 is a plan view showing a back surface of the display device shown in FIG. 11. FIG. 13 is a cross-sectional view taken along line III-III' shown in FIG. 12.

When compared with the display device DD shown in FIG. 7 to FIG. 9, a display device DD2 shown in FIG. 11 to FIG. 13 may have elements which have substantially the same structure as those of the display device DD shown in FIG. 7 to FIG. 9 except that the structure of a circuit board FCB2 and the position of the sensing module FSU are different.

Referring to FIG. 11 to FIG. 13, the circuit board FCB2 according to another embodiment of the present disclosure may have an opening OP. The circuit board FCB2 may be bent along one side surface of the base substrate BS. As the circuit board FCB2 is bent, a portion of the circuit board FCB2 may be on a back surface of the base substrate BS. In this case, the opening OP may be provided to the portion of the circuit board FCB2 positioned on the back surface of the base substrate BS. The opening OP may overlap the fingerprint sensing area FSA.

The sensing module FSU may be inserted into the opening OP and on the back surface of the base substrate BS. The sensing module FSU is electrically coupled to the circuit board FCB2.

The first adhesive member AD1 and the second adhesive member AD2 according to embodiments of the present disclosure may fix the sensing module FSU to the base substrate BS. In FIG. 12 and FIG. 13, a structure in which the display device DD2 is provided with the first adhesive member AD1 and the second adhesive members AD2 is shown, but embodiments of the present disclosure are not limited thereto. For example, a display device according to the present disclosure may be provided with the first adhesive member AD1 only.

Figure 14:
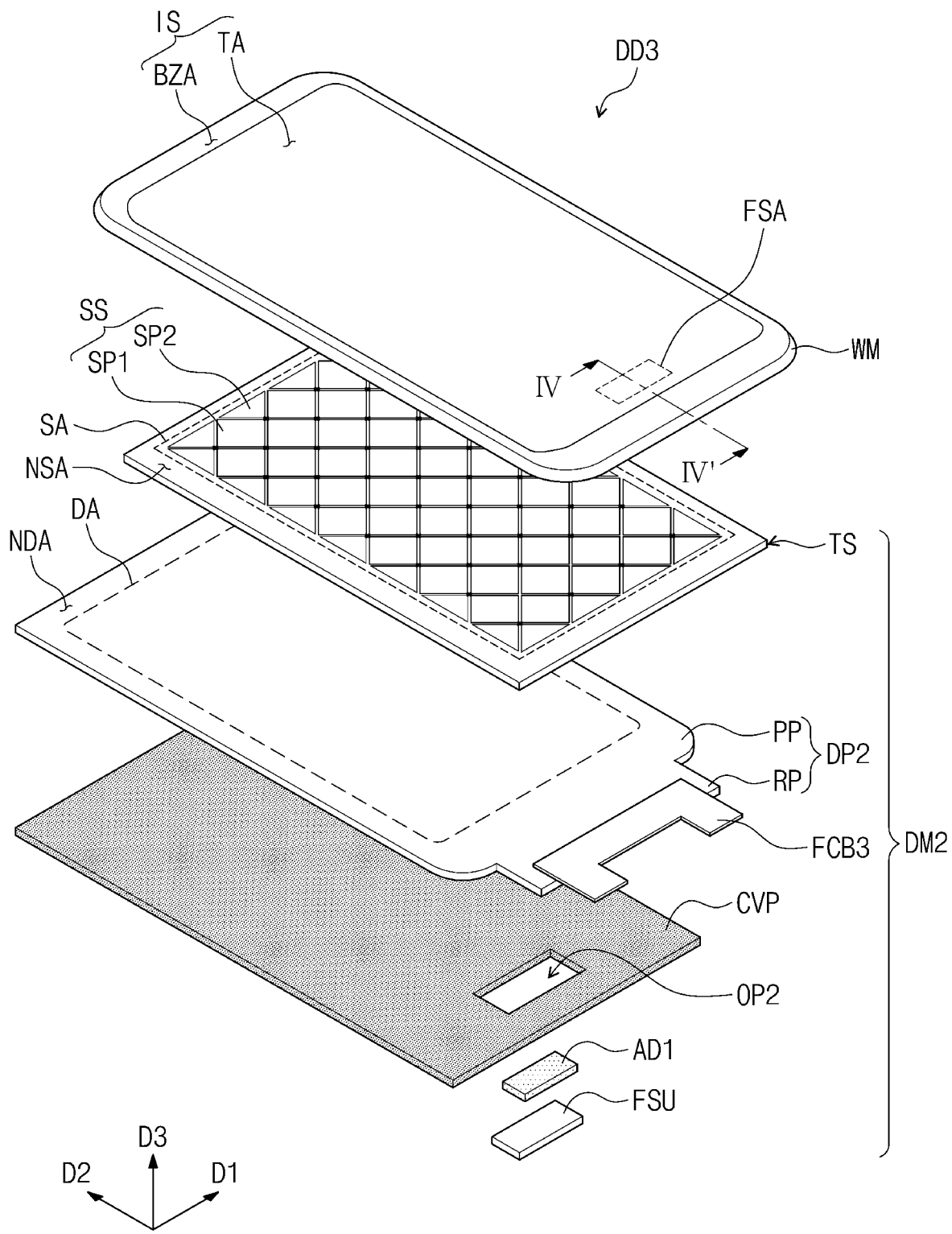
FIG. 14 is an exploded perspective view showing a display device according to another embodiment of the present disclosure.
Figure 15:
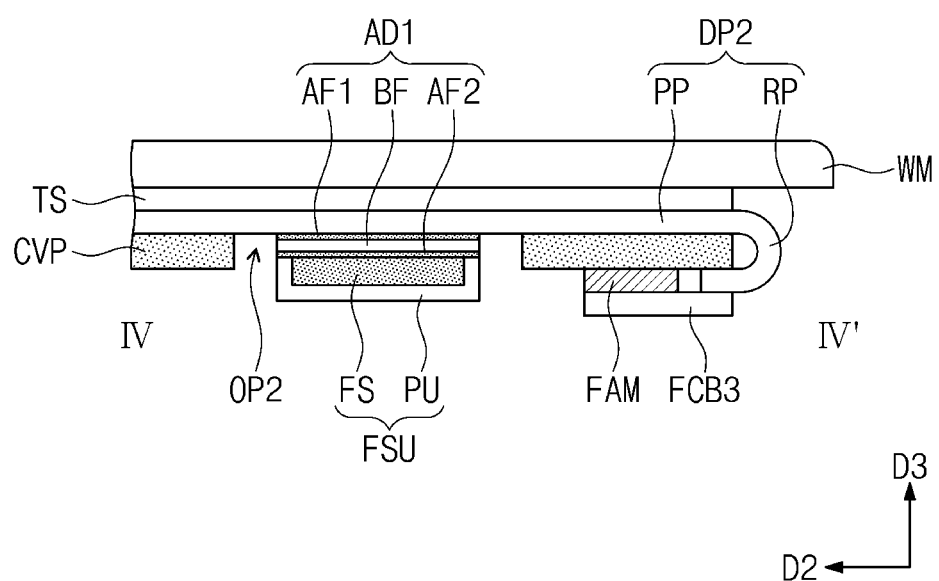
FIG. 15 is a cross-sectional view taken along line IV-IV' shown in FIG. 14.

FIG. 14 is an exploded perspective view showing a display device according to another embodiment of the present disclosure. FIG. 15 is a cross-sectional view taken along line IV-IV' shown in FIG. 14.

Referring to FIG. 14 and FIG. 15, a display device DD3 according to another embodiment of the present disclosure includes a window WM and a display module DM2. Because the window WM corresponds to the window WM shown in FIG. 2, the redundant description thereof will not be repeated here.

The display module DM2 may include a display panel DP2, a circuit substrate FCB3, a touch sensor TS, a cover panel CVP, and the sensing module FSU. The display panel DP2 may have a shape in which one side thereof protrudes on a plane. In the present embodiment, the display panel DP2 may include a planar portion PP and a protrusion portion RP. The protrusion portion RP has a shape of protruding from one side of the planar portion PP.

The touch sensor TS may be on the display panel DP2. The touch sensor TS may sense an external input and obtain information on the position or the intensity of the external input. The external input may include various suitable embodiments. For example, the external input may include various suitable forms of external inputs such as a user's body part, light, heat, and/or pressure. Also, the touch sensor TS may sense not only an input contacting the touch sensor TS, but also a nearby or adjacent input.

The touch sensor TS may include a sensing area SA and a non-sensing area NSA. The sensing area SA may overlap the display area DA.

The non-sensing area NSA is adjacent to the sensing area SA. The non-sensing area NSA may at least partially or completely surround the edge of the sensing area SA. However, this is only exemplary, and the non-sensing area NSA may be adjacent to a portion of the edge of the sensing area SA, or may be omitted, but is not limited to any one embodiment.

A sensing electrode SS is located in the sensing area SA. The sensing electrode SS may include a first sensing electrode SP1 and a second sensing electrode SP2 receiving a different electrical signal. The sensing electrode SS may obtain information on an external input TC through a change in capacitance between the first sensing electrode SP1 and the second sensing electrode SP2.

The first sensing electrode SP1 may be provided in plurality and arranged along the second direction D2 while being spaced apart from each other. The plurality of first sensing electrodes SP1 may be electrically coupled. The second sensing electrode SP2 may be provided in plurality and arranged along the first direction D1 while being spaced apart from each other. The plurality of the second sensing electrodes SP2 may be electrically coupled.

In some embodiments, the touch sensor TS may further provide sensing signal lines in the non-sensing area NSA and either transmit an electrical signal provided from the outside to the first sensing electrode SP1 or provide a signal from the second sensing electrode SP2 to the outside.

The touch sensor TS may be directly on the display panel DP2. For example, the sensing electrodes SP1 and SP2 or the sensing signal lines may be directly on the display panel DP2. In some embodiments, the touch sensor TS may be formed separately from the display panel DP2, and may be attached on the display panel DP2 through an adhesive member. In some embodiments, the touch sensor TS may be on a back surface of the display panel DP2, or inside the display panel DP2. The touch sensor TS according to an embodiment of the present disclosure may be provided in various suitable forms, and is not limited to any one embodiment.

A circuit substrate FCB3 is coupled to one side of the display panel DP2. For example, the circuit substrate FCB3 may be coupled to the protrusion portion RP of the display panel DP2. The display panel DP2 and the touch sensor TS may be driven by one circuit substrate FCB3. However, this is only exemplary, and the circuit substrate FCB3 may be separately provided in each of the display panel DP2 and the touch sensor TS, but is not limited to any one embodiment.

According to embodiments of the present disclosure, the cover panel CVP may be at a position corresponding to the planar portion PP and coupled to the display panel DP2. The cover panel CVP may support a back surface of the display panel DP2. The cover panel CVP may be a metal plate having a stiffness greater than or equal to reference. The cover panel CVP may be a stainless steel plate. The cover panel CVP may be black to block external light incident on the display panel DP2.

The cover panel CVP may have an upper opening OP2. The upper opening OP2 may be provided through the cover panel CVP in correspondence to the fingerprint sensing area FSA. The upper opening OP2 may be defined at a portion overlapping the planar portion PP.

The protrusion portion RP of the display panel DP2 may be bent. The circuit substrate FCB3 coupled to the protrusion portion RP may be arranged in parallel (e.g., substantially in parallel) to the planar portion PP of the display panel DP2. A portion of the cover panel CVP may be between the planar portion PP of the display panel DP2 and the protrusion portion RP. After the protrusion portion RP of the display panel DP2 is bent, the circuit substrate FCB3 may be seated on a back surface of the cover panel CVP. The circuit substrate FCB3 may be fixed to the back surface of the cover panel CVP through an adhesive film FAM.

The sensing module FSU may be inserted into the upper opening OP2 and on the back surface of the display panel DP2. The sensing module FSU may be fixed to the back surface of the display panel DP2 through the first adhesive member AD1. Because the first adhesive member AD1 in these embodiments have the same configuration as the first adhesive member AD1 shown in FIG. 7 to FIG. 9, redundant description thereof will not be repeated here.

In FIG. 14 and FIG. 15, a structure in which the display device DD3 is provided with the first adhesive member AD1 is shown, but embodiments of the present disclosure are not limited thereto. For example, the display device DD3 according to the present disclosure may be further provided with the second adhesive member AD2.

As shown in FIG. 15, the circuit substrate FCB3 may be spaced apart from the sensing module FSU. For example, the circuit substrate FCB may be at a position not overlapping the fingerprint sensing area FSA such that the sensing module FSU is attached to the back surface of the display panel DP2 in correspondence to the fingerprint sensing area FSA.

According to embodiments of the present disclosure, an electronic device is provided with an adhesive member for attaching a sensing module to a back surface of a display module. The adhesive member has a multi-layered structure and is attached to a sensing area of the sensing module including a sensing area, so that an adhesive force between the sensing module and the display module may be increased.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although the subject matter of the present disclosure has been described with reference to example embodiments of the present disclosure, it will be understood by those skilled in the art that various modifications and variations may be made therein without departing from the spirit and scope of the present disclosure as set forth in the following claims, and equivalents thereof. In addition, embodiments disclosed in the present disclosure are not intended to limit the technical spirit of the present disclosure, and all technical concepts falling within the spirit and scope of the following claims and equivalents thereof are to be construed as being included within the scope of the present disclosure.

What is claimed is:

1. An electronic device comprising:
   a display module;
   a first adhesive member having a multi-layered structure and having a first adhesive surface attached on a back surface of the display module;
   a sensing module comprising a sensing area, the sensing area being attached on a second adhesive surface facing the first adhesive surface of the first adhesive member; and
   a second adhesive member,
   wherein the first adhesive member comprises:
   a base layer having a size corresponding to the sensing area and comprising a polymer material;
   a first adhesive layer having a size corresponding to the sensing area and being disposed between the base layer and the display module; and
   a second adhesive layer between the base layer and the sensing module, and
   wherein the second adhesive member is attached to a side surface of the sensing module, a side surface of the base layer, a side surface of the first adhesive layer, a side surface of the second adhesive layer, and the back surface of the display module,
   wherein the base layer has a modulus in a range of about 150 MPa to about 10 GPa.

2. The electronic device of claim 1, wherein each of the first adhesive layer and the second adhesive layer comprises any one selected from an adhesive resin, a pressure sensitive adhesive film, and an optical transparent adhesive film.

3. The electronic device of claim 2, wherein each of the first adhesive layer and the second adhesive layer has an adhesive force of 300 gf/in or greater.

4. The electronic device of claim 1, wherein the base layer comprises a polyester material or a polyimide material.

5. The electronic device of claim 1, wherein the first adhesive member has a thickness in a range of about 5 µm to about 200 µm.

6. The electronic device of claim 1, wherein the second adhesive member comprises a photoinitiator.

7. The electronic device of claim 6, wherein the photoinitiator is configured to be activated by ultraviolet light.

8. The electronic device of claim 6, wherein the photoinitiator comprises any one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide), [1-(4-phenylsulfanylbenzoyl) heptylideneamino]benzoate, [1-[9-ethyl-6-(2-methylbenzoyl)carbazol-3-yl]ethylideneamino] acetate, and Bis(2,4-cyclopentadienyl)bis[2,6-difluoro-3-(1-pyrryl)phenyl] titanium(IV).

9. The electronic device of claim 1, wherein:
   the sensing module and the back surface of the display module are spaced apart from each other at a set interval, and
   a space between the sensing module and the back surface of the display module that are spaced apart from each other is at least partially filled with the first adhesive member.

10. The electronic device of claim 9, wherein the sensing module comprises a fingerprint sensing sensor configured to utilize an ultrasonic wave.

11. The electronic device of claim 1, wherein:
    the display module is divided into a display area configured to display an image, and a peripheral area adjacent to the display area on a plane, and
    the sensing module overlaps the display area on the plane.

12. The electronic device of claim 1, further comprising a circuit substrate electrically coupled to the display module and below the back surface of the display module, wherein the circuit substrate has an opening overlapping the sensing module, and wherein the first adhesive member is attached to the back surface of the display panel exposed by the opening.

13. The electronic device of claim 1, wherein the display module comprises:
   a display panel comprising a plurality of pixels configured to display an image; and
   a cover panel on a back surface of the display panel and having an opening.

14. The electronic device of claim 13, wherein the first adhesive member is attached to the back surface of the display panel exposed by the opening.

15. The electronic device of claim 13, wherein the display panel comprises:
   a planar portion, and a protrusion portion that protrudes from the planar portion and is bent relative to the planar portion, and
   a portion of the cover panel is between the planar portion and the protrusion portion.

16. The electronic device of claim 13, wherein the display panel comprises:
   a base substrate;
   a display element layer on the base substrate;
   an encapsulation layer on the display element layer; and
   an input sensing unit on the encapsulation layer.

17. An electronic device comprising:
   a display module comprising a front surface having a display area and a peripheral area adjacent to the display area, and a back surface facing the front surface;
   a first adhesive member comprising a base layer having a size corresponding to the sensing area and comprising a polymer material, a first adhesive layer on a first surface of the base layer and attached to the back surface of the display module, and a second adhesive layer on a second surface facing the first surface of the base layer;
   a sensing module comprising a sensing area that overlaps the display area and is configured to ultrasonically sense a fingerprint, wherein the second adhesive layer of the first adhesive member is attached to the sensing area; and
   a second adhesive member comprising a photoinitiator, the second adhesive member being attached to a portion of the sensing module and the back surface of the display module,
   wherein the base layer has a modulus in a range of about 150 MPa to about 10 GPa.

18. The electronic device of claim 17, wherein:
   the sensing module and the back surface of the display module are spaced apart from each other at a set interval, and
   a space between the sensing module and the back surface of the display module that are spaced apart from each other is at least partially filled with the first adhesive member.

19. The electronic device of claim 17, wherein the photoinitiator comprises any one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, 2-hydroxy-1-{4-[4-(2-hydroxy-2-methyl-propionyl)-benzyl]-phenyl}-2-methylpropan-1-one, 2-methyl-1 [4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide), [1-(4-phenylsulfanylbenzoyl) heptylideneamino]benzoate, [1-[9-ethyl-6-(2-methylbenzoyl)carbazol-3-yl]ethylideneamino] acetate, and Bis(2,4-cyclopentadienyl)bis[2,6-difluoro-3-(1-pyrryl)phenyl] titanium(IV).

* * * * *